United States Patent Office 3,173,495
Patented Mar. 16, 1965

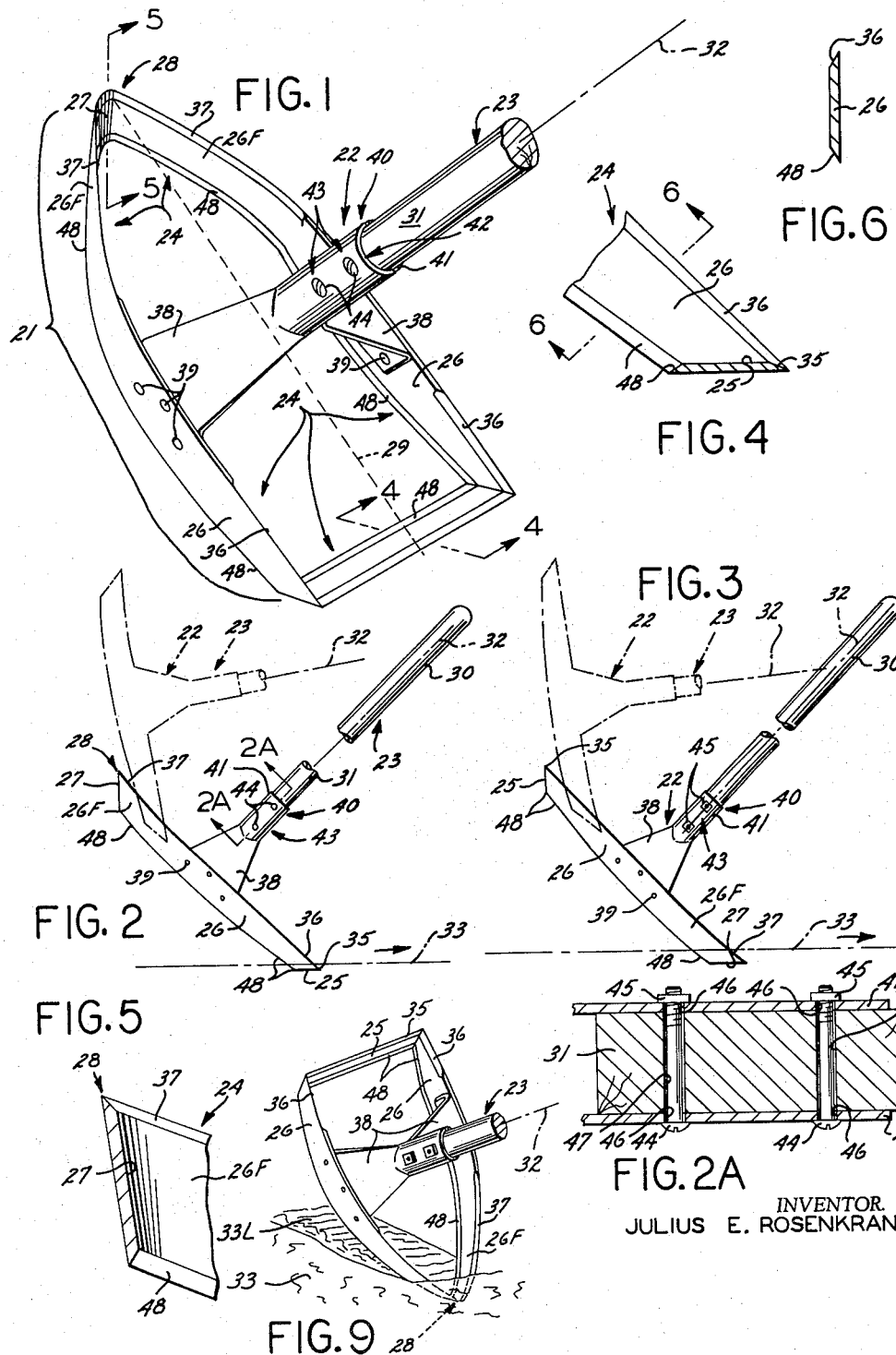

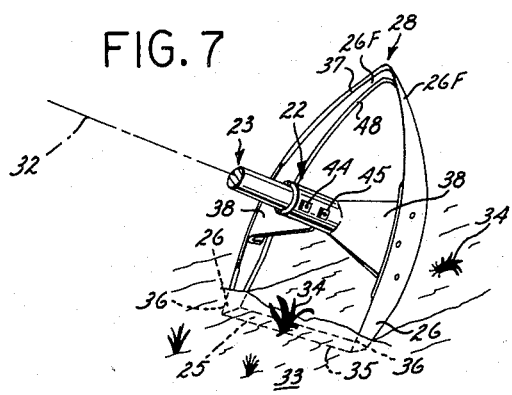
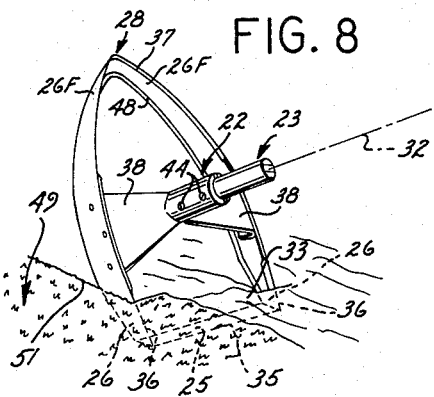
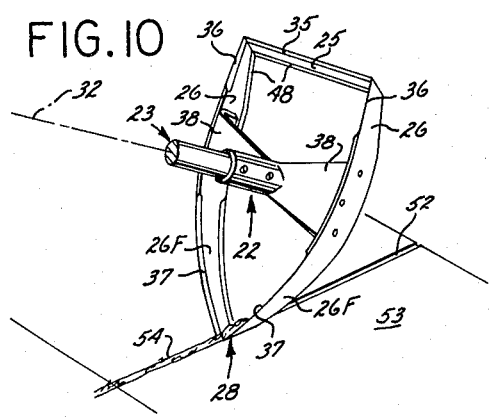
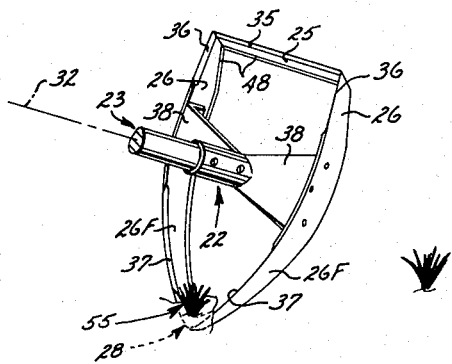
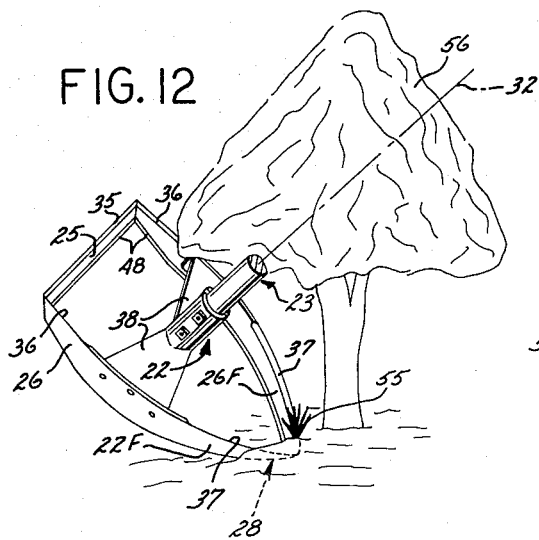
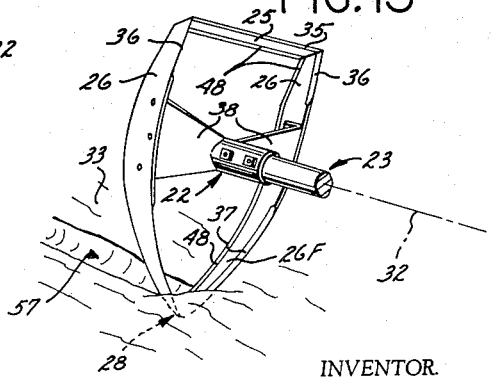

3,173,495
MULTIPURPOSE GARDENING AND AGRICULTURAL IMPLEMENT
Julius E. Rosenkrantz, 7439 Woodman Ave.,
Van Nuys, Calif.
Filed Nov. 8, 1962, Ser. No. 236,269
8 Claims. (Cl. 172—375)

Generally speaking, the present invention relates to the gardening implement and agricultural implement arts and, more particularly, to an improved manually operable multipurpose gardening and/or agricultural implement which may be employed as a soil cultivator, a weeder, a hoe, a lawn edger, and for a variety of other similar uses—and with a minimum of physical effort being required for manual operation of the implement, to a degree such as to make it possible for it to be effectively used by women and children even where the soil is relatively hard and would normally be very difficult to penetrate by hoe, rake, or other similar prior art gardening implement.

Particular note should be taken of the fact that the novel multipurpose gardening and/or agricultural implement of the present invention is primarily a pulling and/or digging tool adapted to be pulled through soil during a weeding operation, a cultivating operation, an edging operation or the like. In other words, it minimizes chopping actions, which are characteristic of conventional prior art hoes and the like and, therefore, does not produce uneven mounds of earth after use in the undesirable manner of prior art hoes and cultivating implements and tools. In other words, the novel device of the present invention may be employed as a weeder or cultivator in a manner such that it is merely smoothly drawn through the soil to be weeded or cultivated whereby to leave the soil in a substantially level arrangement after completion of the weeding and/or cultivating operation rather than in large, uneven hills and valleys as is usually the case after using prior art hoes, rakes, and other gardening tools and implements intended for weeding and/or cultivating use.

Also, it should be noted that the fact that the present invention operates in the manner described above—that is, the fact that it produces a minimal displacement of the soil—also minimizes the amount of force required to effectively operate the implement, thus producing the advantage indicated hereinabove comprising the fact that it can be readily operated by relatively weak persons who might not be able to satisfactorily operate conventional prior art hoes and the like—particularly when attempting to cultivate or weed relatively hard, compacted soil.

Also, it should be noted that, in addition to the soil cultivation and weeding functions of the multipurpose gardening and/or agricultural implement of the present invention, it lends itself extremely well to edging a lawn, to digging weeds or grass out of cracks in sidewalks, driveways, and the like, to digging individual weeds in relatively inaccessible locations without damage to adjacent plants or other easily damaged objects, to digging furrows for seed planting, to digging bulbs without harming them, to digging sod and lawn in a very simple and easy manner, and to generally being useful for gardening and/or agricultural purposes in a great variety of ways equivalent to a substantial number of different individual prior art tools. This is highly advantageous since it makes one tool substitute for many, and also it is more than a mere substitution therefor, since it actually functions better and easier in each of said individual operations than the corresponding and individual prior art tools employed for such purposes in the past.

It is an object of the present invention to provide a novel multipurpose gardening and/or agricultural implement capable of very effective multiple uses with minimal application of force being required to operate the implement and which is directed to the combination of the novel implement head and handle and also to the implement head, per se, as a subcombination thereof.

It is a further object of the present invention to provide a novel multipurpose gardening and/or agricultural implement of the character referred to above and embodying any or all of the various generic and/or specific aspects thereof referred to above and which is of extremely simple, inexpensive, and easy-to-manufacture construction such as to be conducive to widespread use thereof.

Further objects are implicit in the detailed description which follows hereinafter for exemplary rather than limiting purposes and will be apparent to persons skilled in the art after a careful study thereof.

For the purpose of clarifying the nature of the present invention, one exemplary embodiment is illustrated in the hereinbelow described figures of the accompanying drawings and is described in detail hereinafter.

FIG. 1 is a perspective view illustrating one exemplary embodiment of the implement head of the present invention and shows it in mounted relationship with respect to the forward end of a longitudinal handle, which is shown fragmentarily for space-saving reasons.

FIG. 2 is a smaller scale, fragmentary, side elevational view of the invention when in the weeding position with the laterally directed angularly inclined weeding blade means shown in solid lines in a weeding position substantially parallel to, but slightly below, a horizontal ground surface so that it may be drawn therealong in said position for effective weeding action while producing a minimum of soil disturbance and requiring a minimum of pulling force. This view shows the device in phantom in an initial position where said lateral blade means is inclined with respect to the horizontal ground surface to allow the penetration thereof to an extent such as to place it in the solid line weeding position referred to above. In this view the handle means is shown with a center portion thereof broken away and removed for space conservation reasons.

FIG. 2A is an enlarged fragmentary sectional view, taken in the direction of the arrows 2A—2A of FIG. 2.

FIG. 3 is a view similar to FIG. 2, but illustrating the apparatus in cultivating relationship with respect to the soil wherein the pointed blade means is shown in solid lines at a desired level below a horizontal ground surface so that it may be pulled therealong in said relationship for effectively cultivating the soil. This view also shows in phantom said soil cultivating pointed blade means in an initial pre-cultivation position where said pointed blade means is at a sufficiently great angle with respect to the ground surface to allow it to penetrate to a desired depth for the above-described soil cultivating purposes of the implement when the solid line position shown in FIG. 3 (or in a very slightly downwardly inclined position).

FIG. 4 is a larger scale fragmentary view, partly in elevation and partly in section, taken in the direction of the arrows 4—4 of FIG. 1 and clearly illustrated the lateral blade means which is primarily used for weeding purposes, although not specifically so limited—it being also useful in a number of other ways, an exemplary one of which is illustrated in FIG. 8.

FIG. 5 is a slightly larger scale fragmentary view, partly in elevation and partly in section, clearly illustrating the pointed blade means which is primarily used for soil cultivating purposes, although not specifically so limited—it being also useful in a number of other ways as illustrated in part in FIGS. 10–13.

FIG. 6 is a sectional view of one of the two similar side blade means and is taken in the direction of the arrows 6—6 of FIG. 4.

FIG. 7 is a reduced size perspective view illustrating the use of the lateral blade means for weeding purposes in the general manner of FIG. 2. The handle means is shown broken away for space saving reasons.

FIG. 8 is a fragmentary perspective view (with the handle broken away for space saving reasons) illustrating the lateral blade means and adjacent portions of the side blade means being used for edging purposes.

FIG. 9 is a reduced-size, fragmentary, perspective view (with the handle broken away for space saving reasons) illustrating the use of the pointed blade means for soil cultivating purposes in the general manner of FIG. 3.

FIG. 10 is a fragmentary view (with the handle broken away for space saving reasons) illustrating the pointed blade means being used for cleaning out cracks in sidewalks, concrete driveways, or other similar hard surfaces having one or more cracks therein.

FIG. 11 is another fragmentary perspective view (with the handle broken away for space saving reasons) showing the pointed blade means being used as a highly selective weeder for removing an individual weed.

FIG. 12 is another fragmentary perspective view showing the pointed blade means being used for an individual weeding operation where the weed is in a relatively inaccessible location and would be difficult to weed with any other type of implement.

FIG. 13 is a further fragmentary perspective view illustrating the pointed blade means being used at an acute angle with respect to the ground surface, which is accomplished by holding the handle (shown broken away for space saving reasons) at a fairly low level, for effectively producing a furrow or small trench in the horizontal ground surface which may be adapted for several different types of usage, such as for speed planting, irrigation, or the like.

Referring to the figures for illustrative purposes, one exemplary but non-specifically limiting embodiment of the invention takes a typical illustrative form wherein it comprises a multipurpose gardening and/or agricultural implement head, indicated generally at 21, including handle-engageable means, indicated generally at 22, adapted to receive and firmly engage a forward end of a manually graspable handle means indicated generally at 23, and which is shown in the specific exemplary form of the invention illustrated as comprising a straight longitudinal handle of a length such as to facilitate the use of the implement head 21 by a person who is standing erect (or slightly stooped and/or bent forwardly) upon a ground surface adjacent to a region thereof which is to be cultivated, weeded, hoed, edged, or otherwise operated upon by the implement head 21.

It should be noted that the invention is directed to the combination of the implement head 21 and the handle 23 and also to the implement head 21, per se, as a subcombination thereof. However, the invention will be described hereinafter in combination with the handle 23 and this is to be construed in the light of the above statements as to the combination and subcombination aspects of the invention.

In the specific form of the invention illustrated, the handle-engageable means, indicated generally at 22, (which will be described in greater detail hereinfater) effectively carries and is attached to blade means, indicated generally at 24, and comprising a substantially laterally directed weeding blade means 25 integrally provided at opposite ends thereof with side blade means 26 symmetrically extending from the lateral blade means 25 and having forward parts 26F effectively converging at a symmetrically spaced location with respect to said lateral blade means 25 and there being provided with and effectively defining integral junction means 27 effectively comprising pointed blade means, indicated generally at 28.

It will be noted that the pointed blade means 28 is pointed longitudinally away from the lateral blade means 25 along an effective longitudinal plane defined by the sectional-view-indicating arrows 4—4 and 5—5 of FIG. 1 and extending in the longitudinal direction indicated by the interconnecting longitudinal line shown in phantom 29 in FIG. 1; said plane bisecting said lateral blade means 25, said pointed blade means 28 and the handle-engageable means 22.

Said imaginary longitudinal plane 29 also effectively bisects a manually graspable portion 30 of the longitudinal handle means 23 which has its forward end 31 attached with respect to the handle-engageable means 22, as will be described in greater detail hereinafter.

For purposes of definition and clarification, the manually graspable portion 30 of the handle means 23 may be said to lie along a hand-engagement line, which is indicated at 32 and which is in a particular desired spaced angular relationship with respect to the handle-engageable means 22. This is provided so that the lateral blade means 25 and the pointed blade means 28 will each lie in the proper relationship with respect to a horizontal ground surface, as designated by the reference numeral 33, when the corresponding blade means are to be used for weeding purposes or cultivating purposes, as clearly illustrated in FIGS. 2 and 7 in the first case, and in FIGS. 3 and 9 in the second case. These will be described in some detail hereinafter.

In the specific example illustrated, the lateral blade means 25 is effectively angularly inclined downwardly and inwardly and upwardly and outwardly with respect to the handle-engageable means 22 and the handle means 23 adapted to be carried thereby as is best shown in FIGS. 1, 2 and 4. The angular inclination of the lateral blade means 25 just referred to above is such with respect to the normal angular relationship of the handle-engageable means 22, the handle means 23 carried thereby, and the hand-engagement line 32 thereof relative to the horizontal ground surface 33 as to place said lateral blade means 25 *initially* in an angularly inclined relationship with respect to said ground surface 33, as is shown in broken lines in FIG. 2, whereby to plane into the ground as it is pulled by a user of the implement until it has penetrated the ground to a very slight depth, after which it lies in the position shown in solid lines in FIG. 2 (which may also be facilitated by the operator merely shortening his grip on the handle and lifting it slightly higher if needed) whereby to cause said lateral blade means 25 to be in a substantially horizontal position parallel with respect to said ground surface 33 such as to facilitate weeding action by the drawing of said lateral blade means 25 along said ground surface 33 adjacent to, but slightly beneath said ground surface 33 in the manner shown in solid lines in FIG. 2 and in broken lines in FIG. 7. This will clearly cut off all of the weeds 34 slightly below the ground surface 33 and will do so in a manner which disturbs the ground surface 33 very little and does not displace it in uneven humps, or hills and valleys, but leaves it lying substantially level after completion of the weeding operation.

It should be clearly noted that the fact that the implement operates in the manner described above—that is, that it disturbs the soil to an absolutely minimum extent during the weeding operation, also results in minimization of the amount of force required to pull the lateral blade means 25 through the soil underlying the ground surface 33. This makes it possible for a woman or child to operate the implement in a very efficient and effective manner. Of course, the above-described weed cutting operation is facilitated by the provision of cutting edge means 35 carried along the top edge of the lateral blade means 25. This is also true, in the preferred form illustrated, of the adjacent portions of the side blade means 26 which are provided with cutting edge means 36 along the top edges thereof.

The effectively converging forwardly spaced parts 26F of the side blade means 26 joined at the junction means 27 and comprising the pointed blade means, indicated generally at 28, are effectively downwardly angularly and inwardly convergingly inclined and upwardly and outwardly divergingly angularly inclined with respect to said handle-engageable means 22, the handle means 22 carried thereby, and the hand-engagement line 32 thereof relative to the horizontal ground surface 33 in a manner such as to place said pointed blade means 28 and said junction means 27 formed by said inclined forward parts 26F of said side blade means 26 at the junction line thereof in an inclined relationship with respect to the horizontal ground surface 33 when the entire implement is in an initial pre-cultivating position as shown in broken lines in FIG. 3. This is to allow a pulling action on the handle means 23 to cause said pointed blade means 28 to angularly plow downwardly into the soil underlying the ground surface 33 until it reaches a desired depth, after which the operator's grip may be shortened on the handle means 23 and/or the handle means 23 may be slightly lifted until such time as said pointed blade means 28 (and, in particular, the junction means 27 at the apex junction line thereof) lies in a substantially horizontal plane (or very slightly inclined in some cases) at said desired depth below the ground surface 33 so that further pulling action applied to the handle means 23 will cause said pointed blade means 28 to be drawn through the ground at said desired depth along a cultivation line substantially parallel to said ground surface 33.

It will be noted that this operation results in effectively loosening and cultivating the soil, as is clearly shown at 33L in FIG. 9 which indicates the loosened, cultivated ground surface, and does so in a manner which causes a minimum displacement of soil. This acts to prevent the soil from being moved into hills and valleys or uneven irregular surface configuration as is customary with prior art hoes, rakes, and similar cultivating tools.

Also, the fact that the above-described cultivating operation of the novel implement of the present invention results in a minimum displacement of soil, minimizes the force required to effectively perform the cultivating operation, thus making it possible for women and children to use the implement effectively, as mentioned hereinbefore in connection with a weeding operation.

Of course, the above-described cultivating operation is facilitated by the provision of cutting edge means 37 lying along the top edges of the converging forward parts 26F of the side blade means 26 which form the pointed blade means indicated generally at 28.

In the exemplary but non-specifically limiting illustrative form of the invention shown in the drawings, the hereinbefore-mentioned handle-engageable means 22 is illustrated as being provided with a pair of laterally spaced connection members 38 lying symmetrically on each side of the hereinbefore-mentioned longitudinal plane 29 and being rigidly connected to substantially central parts of said side blade means 26 between said lateral blade means 25 and said pointed blade means 28. In the specific example illustrated, said rigid connection is provided by similar spot welding on each side as indicated in part at 39.

Also, in the exemplary form of the invention illustrated, said handle-engageable means 23 comprises effective split ring means 40 including a pair of laterally spaced, effectively inwardly concave arcuate attachment members 41 effectively defining therebetween a receiving socket 42 adapted to receive said forward end 31 of said longitudinal handle means 23 and being provided with fastening means 43 for rigidly connecting said spaced arcuate attachment members 41 to said forward end 31 of said handle means 23.

In the specific example illustrated, said fastening means 43 comprises a pair of threaded fasteners comprising the exteriorly threaded and headed bolts 44 and interiorly threaded nuts 45—with said bolts 44 being adapted to extend through aligned apertures 46 in said attachment members 41 and apertures 47 in said forward end 31 of said handle means 23 and to then engage said threaded nuts 45 which are advanced until the entire fastening means 43 rigidly clamp said attachment members 41 and said forward end 31 of said handle means 23 together. However, said fastening means 43 may comprise rivet means, or any other functional equivalent may be used in lieu thereof.

In the exemplary but non-specifically limiting form of the invention illustrated, bottom edges of the lateral blade means 25, the forward converging parts 26F of the side blade means 26 forming the pointed blade means 28, and rear parts of said side blade means 26 are similarly provided with bottom cutting edge means, as indicated by the reference numeral 48. This facilitates various types of weeding operation of the device other than those described in detail hereinbefore.

It should be noted that the use of the angularly inclined lateral blade means 25 for weeding purposes is indicated in both FIG. 2 and FIG. 7, while the operation of the pointed blade means 28 for soil cultivating purposes is indicated in FIGS. 3 and 9.

FIG. 8 illustrates the operation of the lateral blade means 25 and the cutting edges 36 carried by the adjacent portions of the side blade means 26 for edging purposes. In this view, the edging operation is shown with respect to a body of grass or turf, indicated generally at 49, which will be provided with a very straight edge 51 by reason of the operation of the device in the manner clearly shown in FIG. 8 wherein the lateral blade means 25 and the adjacent portion of the left side blade means 26 are pulled along the edge of the turf 49 to cut the straight line edge 51 thereof. It will be noted that the right side of the lateral blade means 25 and the adjacent portion of the right side blade means 26 are at the same time being drawn through the soil underlying the remaining ground surface 33.

FIG. 10 illustrates the operation of the pointed blade means 28 for crack-cleaning purposes wherein it is adapted to be drawn along a crack 52 in a surface 53 which might be concrete, or other similar surfaces, whereby to remove the undesired material 54 from the crack. Said undesired material 54 may comprise grass, weeds, or anything else, either growing or otherwise, which may be positioned in the crack 52 and which is desired to be removed.

FIG. 11 illustrates the use of the pointed blade means 28 primarily for highly selective and individual weeding of an indiivdual weed such as that shown at 55, thus making it possible to remove an individual weed which might lie among a group of flowers or plants—and to do so without in any way harming said flowers or plants.

FIG. 12 illustrates the use of the pointed blade means 28 for another type of highly selective weeding operation wherein the weed 55 is so positioned as to be inaccessible from directly overhead but must be reached by an angular or side approach, which can be readily accomplished by the novel pointed blade means 28 of the present invention in a manner such as to avoid harming in any way the large overhanging plant 56 which prevents a normal direct top approach for the purpose of removing the weed 55.

FIG. 13 illustrates another use of the pointed blade means 28 where it is placed at an angle such with respect to the ground surface 33 as to effectively produce a small furrow, ditch or trench 57 for any of various different purposes, such as for planting, irrigation, or the like. It will be noted that, in this view, the broken-away handle means 23, and the hand-engagement line thereof, lie at low level relative to the horizontal ground surface 33 which thus effectively inclines the pointed blade means 28 at a sufficient angle with respect to the ground surface 33 to produce the furrow or trench 57.

It should be noted that preferably the entire implement head 21 is made of a very high strength material such as "plow" steel of the type used in making plows, or other suitable steels characterized by great strength, hardness and superior wearing characteristics. This is desirable in order to make it possible to make the entire implement head 21 relatively light while maintaining sufficient strength to allow it to be employed for all of its many possible uses. However, it should be clearly noted that the implement head 21 may be made of any material suitable for the purposes of the invention. Also, it should be noted that the handle 23 may comprise a longitudinal wooden handle as illustrated in the drawings or may be made of any other suitable material, either of solid or hollow tubular construction, capable of functioning effectively for the purposes of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A multipurpose gardening and agricultural implement head adapted to be fastened to one end of a longitudinal manually graspable actuating handle, comprising: handle-engageable means adapted to receive and firmly engage a forward end of a longitudinally manually graspable actuating handle having a manually graspable portion spaced from said handle-engageable means and lying along a hand-engagement line having a particular desired spaced angular relationship with respect to said handle-engageable means; and blade means comprising a substantially laterally directed weeding blade means integrally provided at opposite ends thereof with side blade means symmetrically extending therefrom substantially at right angles with respect thereto and having forward side blade parts effectively converging at similarly symmetrically spaced locations with respect to said lateral blade means and forwardly spaced therefrom and there being joined together to provide and define angular integral junction means comprising pointed blade means directed longitudinally away from said lateral blade means along an effective longitudinal plane bisecting said lateral blade means, said pointed blade means, and said handle-engageable means and being coplanar with said hand-engagement line, said handle-engageable means being provided with a pair of laterally spaced connection members symmetrically positioned on each side of said effective longitudinal plane and rigidly connected to substantially centrally positioned parts of said side blade means between said lateral blade means and said pointed blade means; said lateral blade means being effectively angularly inclined downwardly and inwardly toward a bottom edge thereof and upwardly and outwardly toward a top edge thereof relative to said handle-engageable means and said hand-engagement line, said lateral blade means having cutting edge means along said top edge thereof, said angular inclination of said lateral blade means with respect to the normal angular relationship of said handle-engageable means and said hand-engagement line relative to a horizontal ground surface adapted to be weeded by said lateral blade means being such as to place said inclined lateral blade means in a substantially horizontal position substantially parallel with respect to said horizontal ground surface whereby to facilitate weeding action by drawing said lateral blade means along said ground surface adjacent to but slightly beneath the top thereof; said effectively converging forward side blade parts and said junction means defined thereby and comprising said pointed blade means being effectively convergingly angularly and inwardly downwardly inclined toward bottom edges thereof and upwardly and outwardly and divergingly angularly inclined toward top edges thereof relative to said handle-engageable means and said hand-engagement line, said pointed blade means having cutting edge means along said top edges thereof; said angular inclination of said pointed blade means with respect to the normal angular relationship of said handle-engageable means and said hand-engagement line relative to a horizontal ground surface adapted to be cultivated by said pointed blade means being such as to place said inclined pointed blade means in an initially slightly downwardly inclined position with respect to said horizontal ground surface whereby to facilitate ground-cultivating action by initial penetration of said ground surface to a desired depth and by subsequent movement therethrough in a substantially horizontal manner substantially parallel to said horizontal ground surface at said desired depth below the top of said ground surface as a result of pulling movement adapted to be applied to said pointed blade means by said handle.

2. A device as defined in claim 1, wherein said handle-engageable means comprises effective receiving socket means adapted to receive said forward end of said longitudinal handle and being provided with fastening means for rigidly interconnecting same.

3. A device as defined in claim 1, wherein said handle-engageable means comprises receiving socket means taking the form of split ring means including a pair of laterally spaced, effectively inwardly concave attachment members effectively defining therebetween a receiving socket adapted to receive said forward end of said longitudinal handle, and being provided with fastening means for rigidly connecting said spaced attachment members to said forward end of said handle.

4. A device as defined in claim 1, wherein said handle-engageable means comprises receiving socket means taking the form of split ring means including a pair of laterally spaced, effectively inwardly concave attachment members effectively defining therebetween a receiving socket adapted to receive said forward end of said longitudinal handle, and being provided with fastening means for rigidly connecting said spaced attachment members to said forward end of said handle, said fastening means comprising at least one threaded fastener adapted to extend through said laterally spaced attachment members and said forward end of said handle and rigidly clamp same together.

5. A device as defined in claim 1, wherein said lateral blade means has cutting edge means along said bottom edge thereof.

6. A device as defined in claim 1, wherein said pointed blade means has cutting edge means along said bottom edges thereof.

7. A device as defined in claim 1, wherein said lateral blade means and said pointed blade means have cutting edge means along the bottom edges thereof.

8. A multipurpose gardening and agricultural implement head adapted to be fastened to one end of a longitudinal manually graspable actuating handle, comprising: handle-engageable means adapted to receive and firmly engage a forward end of a longitudinal manually graspable actuating handle having a manually graspable portion spaced from said handle-engageable means and lying along a hand-engagement line having a particular desired spaced angular relationship with respect to said handle-engageable means; and blade means comprising a substantially laterally directed weeding blade means integrally provided at opposite ends thereof with side blade means symmetrically extending therefrom substantially at right angles with respect thereto and having forward side blade parts effectively converging at similarly symmetrically spaced locations with respect to said lateral blade means and forwardly spaced therefrom and there being joined together to provide and define angular integral junction means comprising pointed blade means directed longitudinally away from said lateral blade means along an effective longitudinal plane bisecting said lateral blade means, said pointed blade means, and said handle-engageable means and being coplanar with said hand-engagement line, said handle-engageable means being provided with a pair of laterally spaced connection members symmetrically positioned on each side of said effective longitudinal plane and rigidly connected to substantially centrally positioned parts of said side blade means between said lateral blade means and said pointed blade means; said lateral blade means being effectively angularly inclined downwardly and inwardly toward a bottom edge thereof and upwardly and outwardly toward a top edge thereof relative to said handle-engageable means and said hand-engagement line, said lateral blade means having cutting edge means along said top edge thereof, said angular inclination of said lateral blade means with respect to the normal angular relationship of said handle-engageable means and said hand-engagement line relative to a horizontal ground surface adapted to be weeded by said lateral blade means being such as to place said inclined lateral blade means in a substantially horizontal position substantially parallel with respect to said horizontal ground surface whereby to facilitate weeding action by drawing said lateral blade means along said ground surface adjacent to but slightly beneath the top thereof; said effectively converging forward side blade parts and said junction means defined thereby and comprising said pointed blade means being effectively convergingly angularly and inwardly downwardly inclined toward bottom edges thereof and upwardly and outwardly and divergingly angularly inclined toward top edges thereof relative to said handle-engageable means and said hand-engagement line, said pointed blade means having cutting edge means along said top edges thereof; said angular inclination of said pointed blade means with respect to the normal angular relationship of said handle-engageable means and said hand-engagement line relative to a horizontal ground surface adapted to be cultivated by said pointed blade means being such as to place said inclined pointed blade means in an initially slightly downwardly inclined position with respect to said horizontal ground surface whereby to facilitate ground-cultivating action by initial penetration of said ground surface to a desired depth and by subsequent movement therethrough in a substantially horizontal manner substantially parallel to said horizontal ground surface at said desired depth below the top of said ground surface as a result of pulling movement adapted to be applied to said pointed blade means by said handle; said lateral blade means and said pointed blade means having cutting edge means along the bottom thereof; said handle-engageable means comprising receiving socket means taking the form of split ring means including a pair of laterally spaced, effectively inwardly concave attachment members effectively defining therebetween a receiving socket adapted to receive said forward end of said longitudinal handle, and being provided with fastening means for rigidly connecting said spaced attachment members to said forward end of said handle, said fastening means comprising at least one threaded fastener adapted to extend through said laterally spaced attachment members and said forward end of said handle and rigidly clamp same together.

References Cited in the file of this patent

UNITED STATES PATENTS

| 270,016 | Chambard | Jan. 2, 1883 |
| 824,862 | Hilton | July 3, 1906 |
| 2,446,512 | Miller | Aug. 3, 1948 |

FOREIGN PATENTS

| 748,601 | France | Apr. 18, 1933 |